United States Patent
Wu

(10) Patent No.: US 10,527,251 B2
(45) Date of Patent: *Jan. 7, 2020

(54) HEADLIGHT CONTROL SYSTEM

(71) Applicant: MING CHI UNIVERSITY OF TECHNOLOGY, New Taipei (TW)

(72) Inventor: Chang Jo Wu, Taoyuan County (TW)

(*) Notice: Subject to any disclaimer, the term of this patent is extended or adjusted under 35 U.S.C. 154(b) by 0 days.

This patent is subject to a terminal disclaimer.

(21) Appl. No.: 16/027,492

(22) Filed: Jul. 5, 2018

(65) Prior Publication Data

US 2018/0313507 A1 Nov. 1, 2018

Related U.S. Application Data

(63) Continuation of application No. 14/548,398, filed on Nov. 20, 2014, now Pat. No. 10,030,835.

(51) Int. Cl.
| | | |
|---|---|---|
| *F21S 41/63* | (2018.01) | |
| *B60Q 1/14* | (2006.01) | |
| *B60Q 1/08* | (2006.01) | |
| *F21S 41/663* | (2018.01) | |
| *F21S 41/25* | (2018.01) | |

(52) U.S. Cl.
CPC ............ *F21S 41/635* (2018.01); *B60Q 1/085* (2013.01); *B60Q 1/1423* (2013.01); *F21S 41/663* (2018.01); *B60Q 2300/112* (2013.01); *B60Q 2300/314* (2013.01); *B60Q 2300/42* (2013.01); *F21S 41/25* (2018.01)

(58) Field of Classification Search
CPC ........ F21S 41/635; F21S 41/663; F21S 41/25; F21S 41/63; F21S 41/60; B60Q 1/085; B60Q 1/1423; B60Q 2300/112; B60Q 2300/314; B60Q 2300/42; B60Q 1/08; B60Q 1/076; B60Q 1/06; F21V 14/06; F21W 2102/13

See application file for complete search history.

(56) References Cited

U.S. PATENT DOCUMENTS

| 4,768,135 A * | 8/1988 | Kretschmer | B60Q 1/085 362/466 |
|---|---|---|---|
| 4,857,794 A * | 8/1989 | Watanabe | F21S 41/635 313/113 |
| 5,068,768 A * | 11/1991 | Kobayashi | F21S 41/28 362/539 |
| 5,138,540 A * | 8/1992 | Kobayashi | B60Q 1/122 362/268 |

(Continued)

*Primary Examiner* — Bao Q Truong

(57) ABSTRACT

One object of the present invention is to provide a headlight control system. The headlight control system is configured to be used with a headlight of a vehicle. The headlight control system includes a first light sensor, a microcontroller, a first driving motor and an optical lens module. The optical lens module is disposed in front of the headlight to receive illumination of the headlight. The microcontroller is electrically connected to the first light source sensor and configured to receive a signal transmitted by the first light sensor. The first driving motor is electrically connected to the microcontroller. The first driving motor is configured to follow an instruction from the microcontroller to drive a first driving mechanism. The first driving mechanism is configured to adjust the optical lens module upon being driven by the first driving motor.

4 Claims, 9 Drawing Sheets

(56) References Cited

U.S. PATENT DOCUMENTS

| | | | | |
|---|---|---|---|---|
| 6,186,651 | B1 * | 2/2001 | Sayers | F21S 41/17 |
| | | | | 362/512 |
| 10,030,835 | B2 * | 7/2018 | Wu | B60Q 1/1423 |
| 2003/0193813 | A1 * | 10/2003 | Collins | F21S 41/635 |
| | | | | 362/465 |
| 2004/0240221 | A1 * | 12/2004 | Choi | B60Q 1/14 |
| | | | | 362/510 |

* cited by examiner

HEADLIGHT CONTROL SYSTEM

BACKGROUND OF THE INVENTION

1. Field of the Invention

The present invention relates to a headlight control system, more particularly to a headlight control system auto-adjusting an illumination angle of the headlight and a projection focal length of the headlight.

2. Description of the Prior Art

As far as moving vehicles are concerned, headlight of vehicles not only functions as illumination in the nighttime but also serves as a warning.

Currently, most headlights only provide two-stage illumination ranges, high beam light and low beam light. When vehicles travel in the mountain or in heavy rain, drivers usually turn on the high beam light for the poor eyesight environment. However, when the high beam light shines into eyes of a driver in a vehicle from the opposite direction, the driver's eyes get glare easily that the driver can't see the road ahead. Therefore, when two vehicles drive passing each other at night, the drivers in both vehicles would switch the high beam light to the low beam light for preventing the glare.

However, if the traveling speed of the vehicle from the opposite direction or our vehicle is faster, drivers of both vehicles can't immediately switch the high beam light to the low beam light, so the sightlines of drivers of both vehicles are still affected by the high beam light.

From the above, when in the mountain or in heavy rain, drivers would use a high beam mode. When vehicles are driven at a rapid speed at night, drivers of the vehicles would also switch the headlight to high beam mode for helping to see a farther vision and increasing traffic safety. However, today drivers still rely on a manual way to switch illumination modes of the headlights, so it is easy to cause the drivers to distract at a rapid speed.

In addition, when drivers need to find an address or a road, the drivers would drive on the street with a lower speed. To do so, the drivers would also switch a projection focal length of headlights so as to see both sides of the street. However, today drivers still rely on a manual way to switch the projection focal length of the headlights, so switching the projection focal length of the headlights is not convenient.

From the above, when in the mountain or in heavy rain, drivers would use a high beam mode. When vehicles are driven at a rapid speed at night, drivers of the vehicles would also switch the headlight to high beam mode for helping to see a farther vision and increasing traffic safety. However, today drivers still rely on a manual way to switch illumination modes of the headlights, so it is easy to cause the drivers to distract at a rapid speed.

In addition, when drivers need to find an address or a road, the drivers would drive on the street with a lower speed. To do so, the drivers would also switch a projection focal length of headlights so as to see both sides of the street. However, today drivers still rely on a manual way to switch the projection focal length of the headlights, so switching the projection focal length of the headlights is not convenient.

Therefore, how to design a headlight control system that can adjust the angle and the projection focal length of the headlight automatically and rapidly is worth considering to a person having ordinary skills in the art.

SUMMARY OF THE INVENTION

One object of the present invention is to provide a headlight control system including a first light sensor, an optical lens module, a microcontroller and a first driving motor. The optical lens module is disposed in front of a headlight of a vehicle in order to receive illumination of the headlight. The microcontroller configured to receive a signal of indicating an increased luminous flux detected by the first light sensor. The first driving motor electrically is connected to the microcontroller and following an instruction from the microcontroller to drive a first driving mechanism to adjust the optical lens module. Wherein the first driving motor is instructed to drive the first driving mechanism to adjust an angle of the optical lens module to turn an irradiation angle of the headlight into a low beam mode when the microcontroller receives the signal.

In the headlight control system, the microcontroller is further configured to receive a speed value detected by a velocity sensor of the vehicle, and the first driving motor is instructed to drive the first driving mechanism to adjust an angle of the optical lens module to turn an irradiation angle of the headlight into a high beam mode when the detected speed value is higher than a first speed value.

In the headlight control system, the first driving mechanism is configured to use a multi-stage approach for adjusting the optical lens module.

In the headlight control system, the first driving motor is a stepper motor.

another object of the present invention is to provide a headlight control system including an optical lens module, a microcontroller and a second driving motor. The optical lens module is disposed in front of a headlight of a vehicle to receive illumination of the headlight. The microcontroller is configured to receive a speed value detected by a velocity sensor of the vehicle. The second driving motor is electrically connected to the microcontroller and following an instruction from the microcontroller to drive a second driving mechanism to move the optical lens module. Wherein the second driving motor is instructed to drive the second driving mechanism to move the optical lens module to reduce a distance between the optical lens module and the headlight when the detected speed value is less than a second speed value.

The foregoing, as well as additional objects, features and advantages of the invention will be more readily apparent from the following detailed description, which proceeds with reference to the accompanying drawings.

DESCRIPTION OF THE INVENTION

Figure 1:
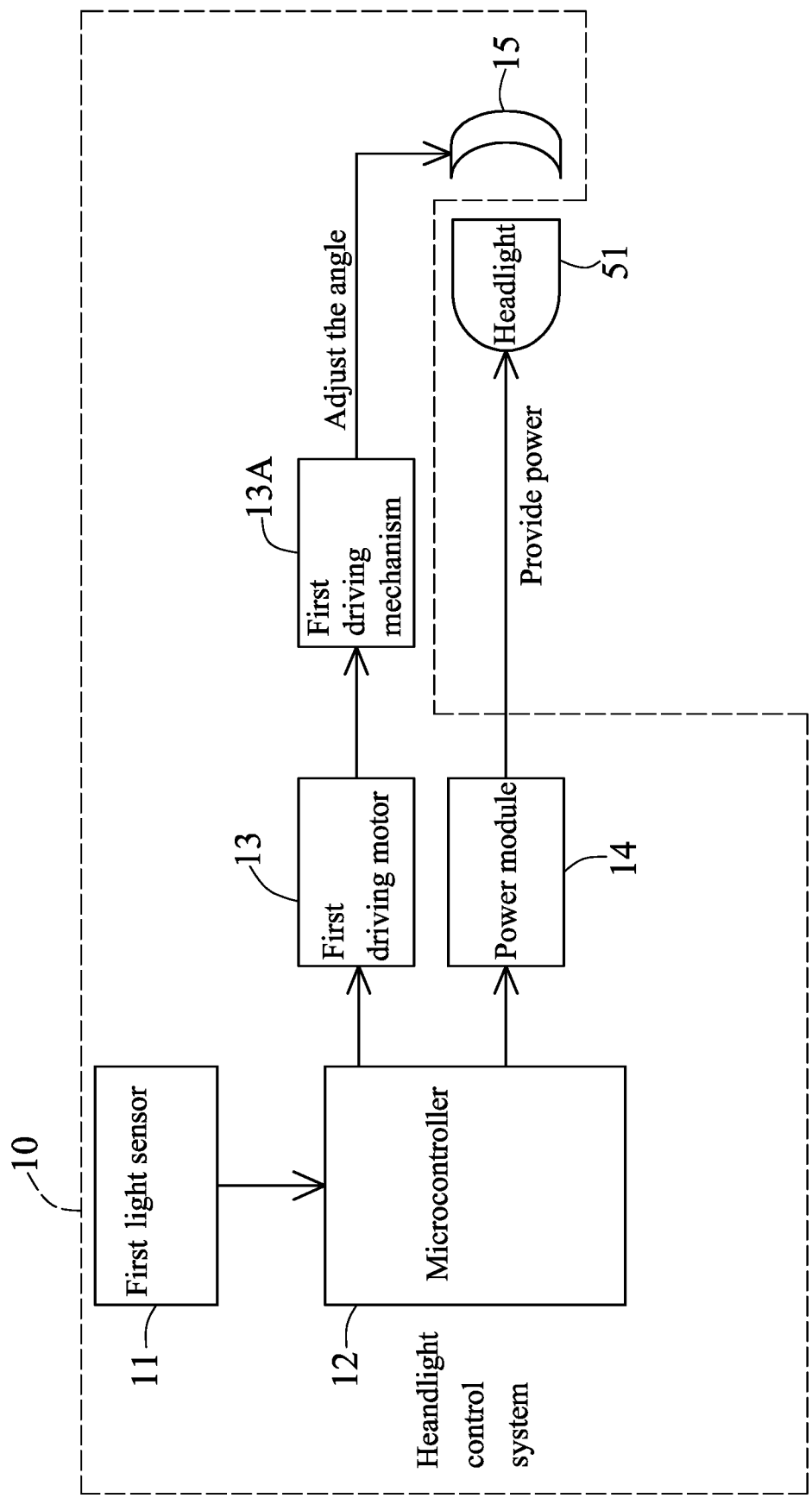
FIG. 1 illustrates a headlight control system 10 in accordance with an embodiment of the present invention.
Figure 2:
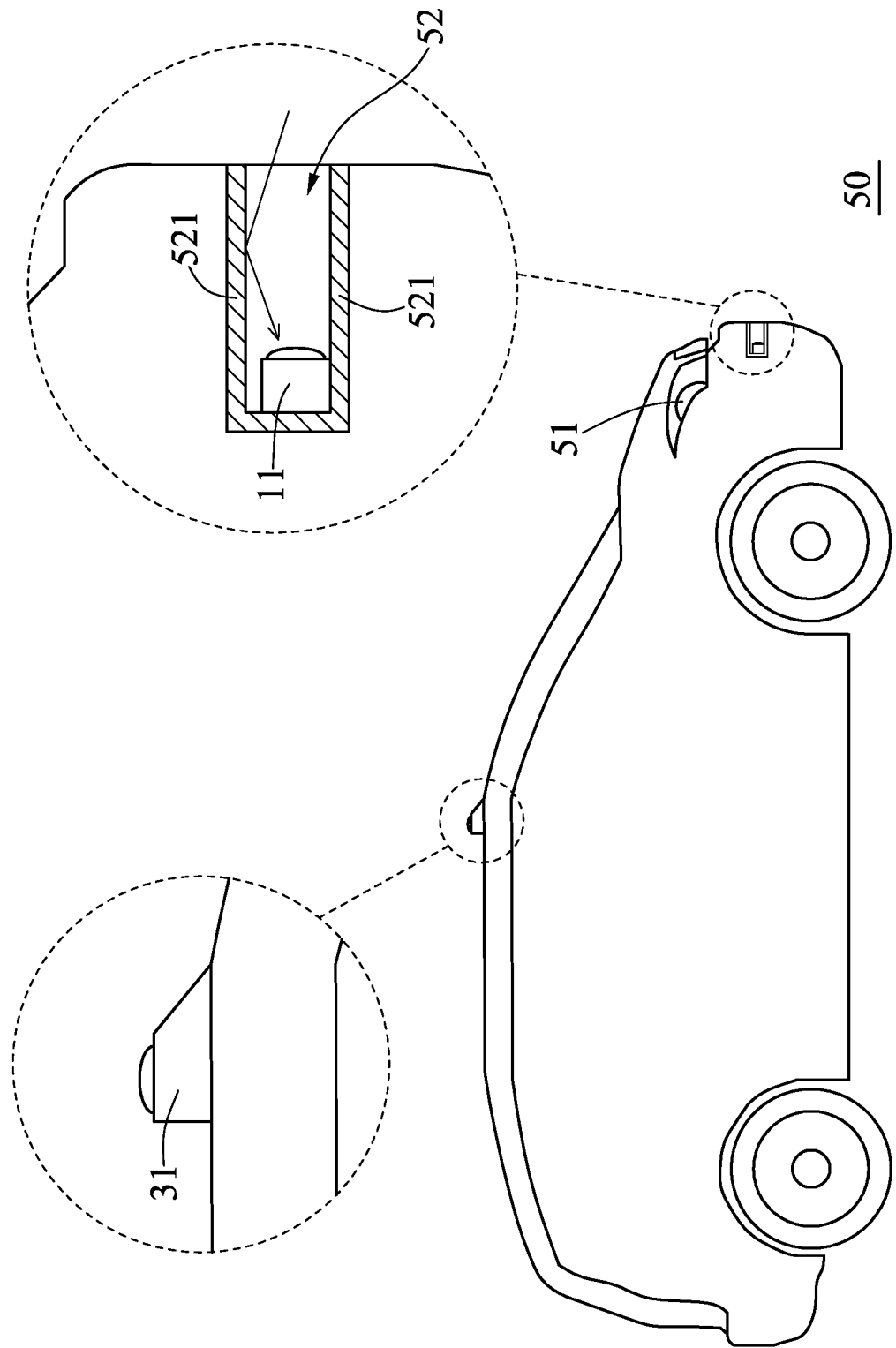
FIG. 2 illustrates a schematic diagram showing arrangement of a first light sensor and a second light sensor.
Figure 8:
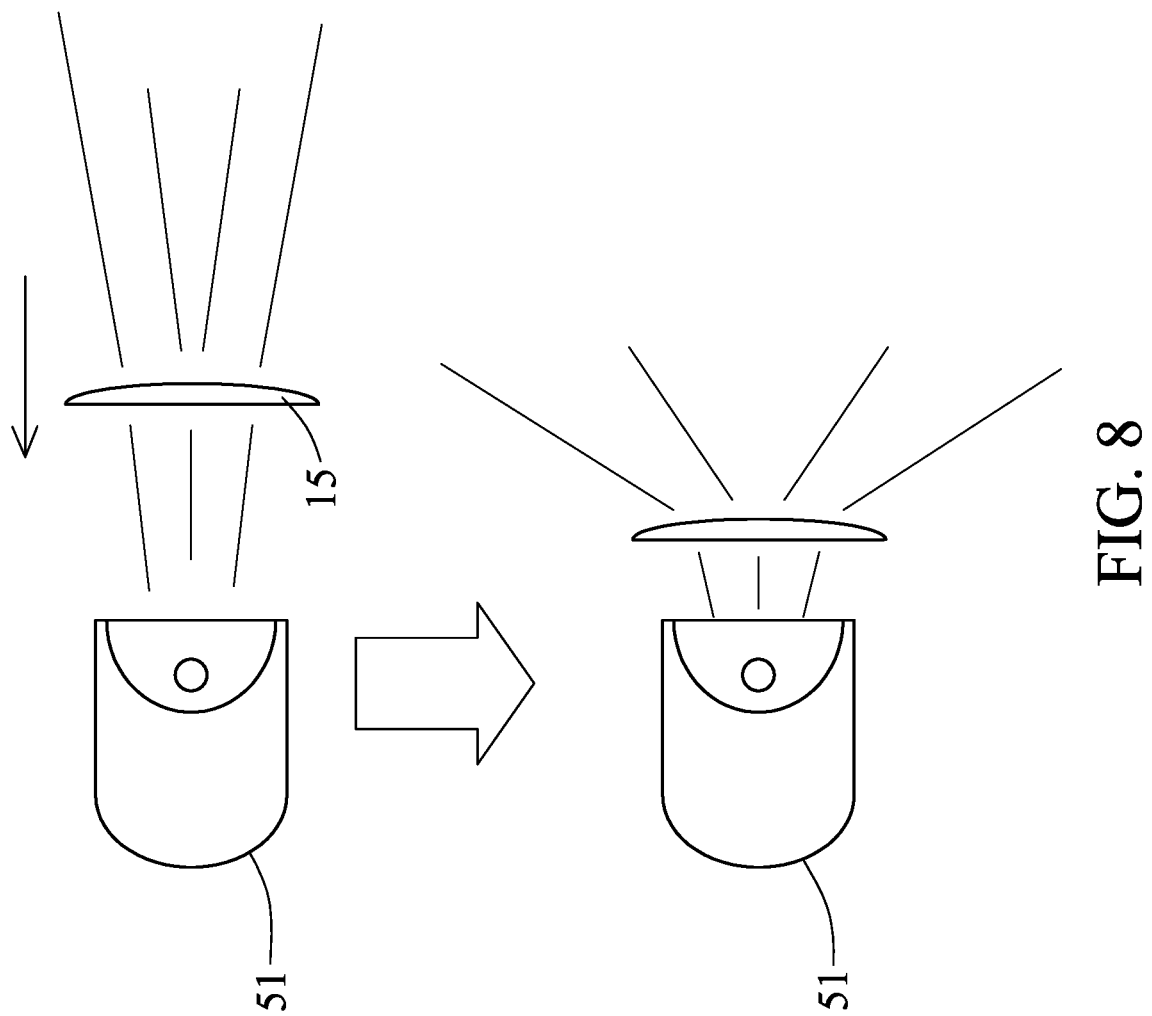
FIG. 8 illustrates a schematic diagram of the headlight 51 shortening a projection focal length thereof.
Figure 9:
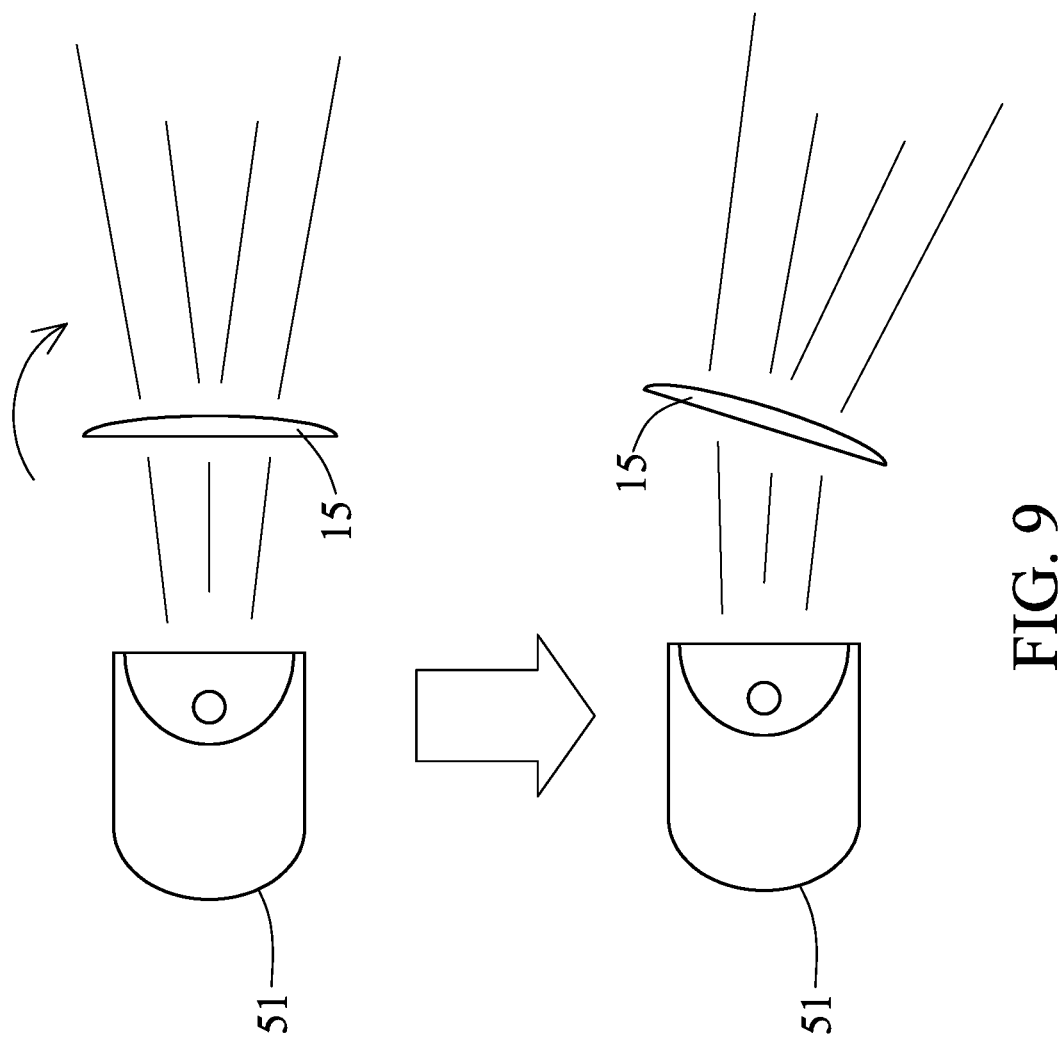
FIG. 9 illustrates a schematic diagram of the optical lens module 15 changing illuminating angle thereof.

Please refer to FIG. 1 and FIG. 2. FIG. 1 illustrates a headlight control system 10 in accordance with an embodiment of the present invention. FIG. 2 illustrates a schematic diagram showing arrangement of a first light sensor and a second light sensor. The headlight control system 10 is configured to be used with a headlight 51 of an automobile 50. The headlight control system 10 includes a first light sensor 11, a microcontroller 12, a first driving motor 13, a power module 14, and an optical lens module 15. The front part of automobile 50 comprises a recess 52. An inner side of the recess is coated with reflective material 521, and the first light source sensor 11 is embedded in the recess 52. When the automobile 50 is irradiated by an oncoming light (For example, the oncoming light is emitted by a headlight of an oncoming vehicle), the reflective material 521 is helpful in reflecting the illumination of the headlight to the first light sensor 11, so as to enhance sensitivity of the first light sensor 11. Moreover, because the first light sensor 11 is embedded in the recess 52 and the illumination of the headlight 51 is projected toward the front, the illumination of the headlight 51 can't irradiate the first light sensor 11. Specifically, the first light sensor 11 can only sense a light emitted from the headlight of the oncoming vehicle, and the first light sensor 11 can't sense a light emitted from the headlight 51 of the automobile 50. From the above, the optical lens module 15 of the headlight control system 10 is disposed in front of the headlight 51 for receiving the illumination of the headlight 51. Please refer to FIG. 8; FIG. 8 illustrates a schematic diagram of the headlight 51 shortening a projection focal length thereof. By controlling the distance between the optical lens module 15 and the headlight 51, the projection focal length of headlight 51 can be adjusted. FIG. 9 illustrates a schematic diagram of the optical lens module 15 changing illuminating angle thereof. By controlling the illuminating angle of the optical lens module 15, the irradiation angle of the headlight 51 can be adjusted.

Figure 3:
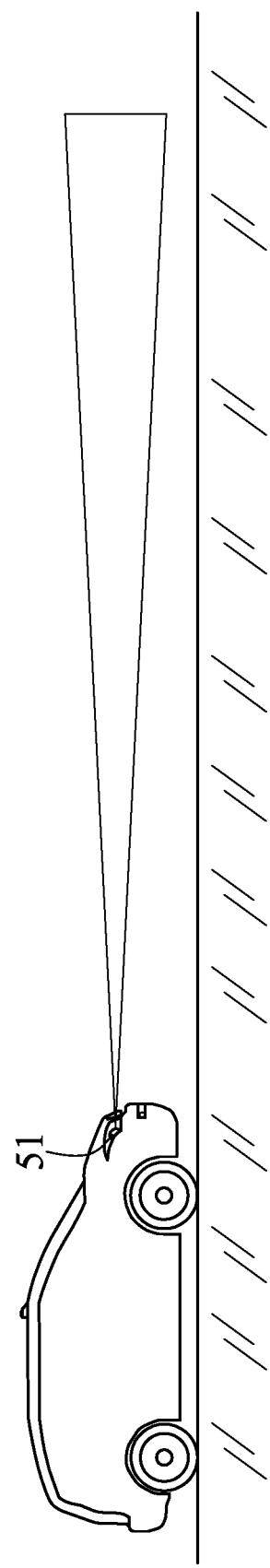
FIG. 3 illustrates a schematic diagram of a headlight 51 illuminating in high beam mode.
Figure 4:
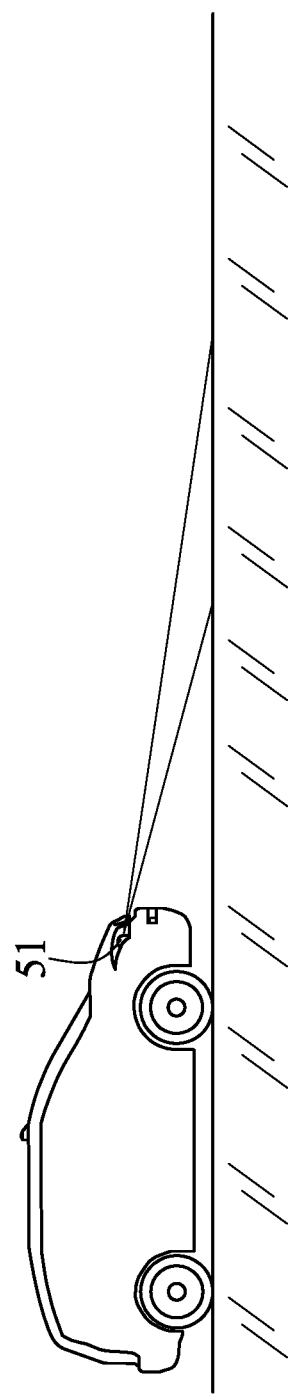
FIG. 4 illustrates a schematic diagram of the headlight 51 illuminating in low beam mode.
Figure 5:
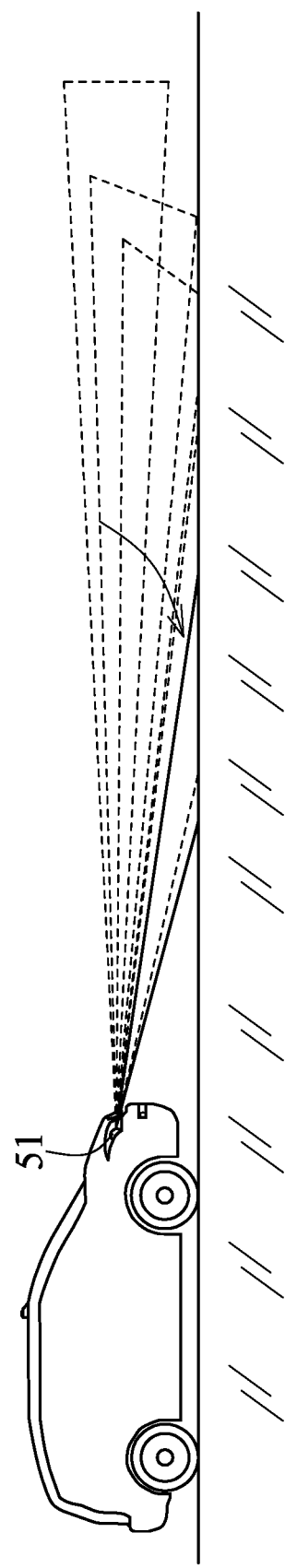
FIG. 5 illustrates a schematic diagram of an optical lens module 15 supporting multi-stage changes.

In addition, the microcontroller 12 is electrically connected to the first light sensor 11, the first driving motor 13, and the power module 14. The microcontroller 12 is configured to receive a signal transmitted from the first light sensor 11. Based on the signal transmitted from the first light sensor 11, the microcontroller 12 would generate and send a control instruction to the first driving motor 13. Based on the control instruction, the first driving motor 13 would drive the first driving mechanism 13A. Afterward, the first driving mechanism 13A adjusts an illuminating angle of the optical lens module by using a mechanical driven approach. For example, please refer to FIG. 3 which illustrates a schematic diagram of the headlight 51 illuminating in high beam mode. When the irradiation angle of the headlight 51 is in a high beam mode and the first light sensor 11 receives suddenly-increased the luminous flux (A light emitting source suddenly shows up in front of the automobile 50), the microcontroller 12 would generate and send a control instruction to the first driving motor 13. Based on the control instruction, the first driving motor 13 would drive the first driving mechanism 13A. Afterward, the first driving mechanism 13A would adjust the angle of the optical lens module 15 into a low beam mode (please refer to FIG. 4 and FIG. 9; FIG. 4 illustrates a schematic diagram of the headlight 51 illuminating in low beam mode.). As a result, when two cars pass each other at night, if it is too late for the drivers to switch the headlights 51 to the low beam mode, the headlight control system 10 will automatically adjust the optical lens module 15 into the low beam mode. Therefore, the drivers would not be affected by glare at night. The power module 14 is configured to power the headlights 51. The headlights 51 can emit light when the headlights get the power. From the above, the first driving motor 13 for example is a stepper motor and the first driving mechanism 13A is configured to use a multi-stage approach for adjusting an angle of the optical lens module 15 (please refer to FIG. 5 which illustrates a schematic diagram of an optical lens module 15 supporting multi-stage changes.). In contrast to the traditional headlight only supporting two-stage changes for the irradiation angle, the headlight control system 10 of the present embodiment supports multi-stage changes for the irradiation angle. As a result, drivers adapt the light source changes easily when the drivers switch the irradiation angle of the headlights 51.

Figure 6:
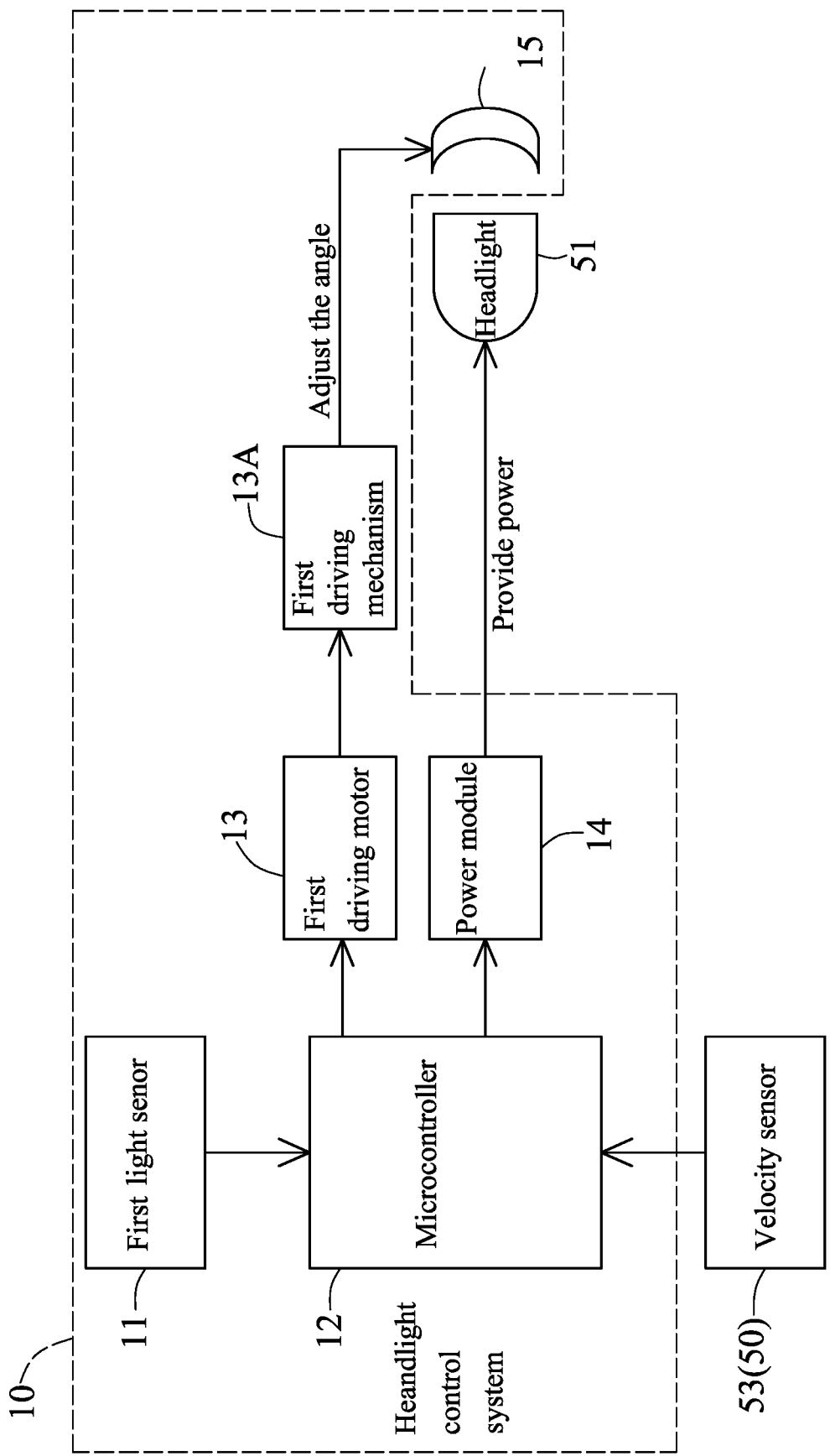
FIG. 6 illustrates a schematic diagram of the headlight control system 10 electrically connected to a velocity sensor 53.

Please refer to FIG. 6. FIG. 6 illustrates a schematic diagram of the headlight control system 10 electrically connected to a velocity sensor 53. The velocity sensor 53 of the automobile 50 is electrically connected to the microcontroller 12, and the microcontroller 12 is configured to receive a signal transmitted from the velocity sensor 53. When an angle of the optical lens module 15 is in a low beam mode and a speed value of the automobile 50 detected by the velocity sensor 53 is more than a first speed value (such as speed of 60 km), the microcontroller 12 would generate and send another control instruction to the first driving motor 13. Afterward, based on the control instruction, the first driving motor 13 would adjust the angle of the optical lens module 15 into a high beam mode (Please refer to FIG. 3 again). Conventionally the drivers adjust the irradiation angle of the headlight 51 by a manual way at high speed. However, the headlight control system 10 of the present embodiment can automatically adjust the irradiation angle of the headlight 51 into a high beam mode at high speed, so the drivers driving the automobile 50 at high speed are safer.

Figure 7:
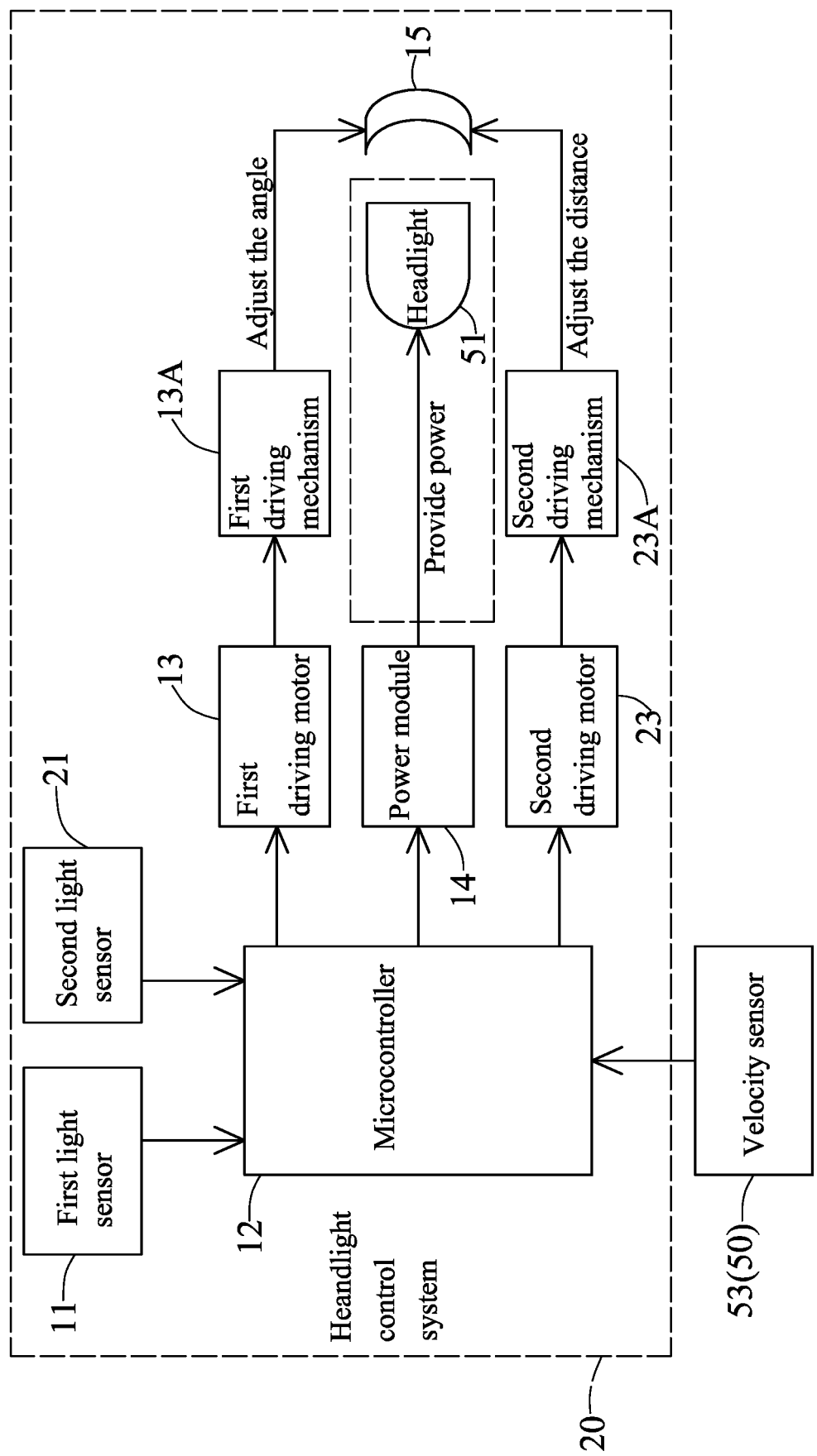
FIG. 7 illustrates a headlight control system 20 in accordance with another embodiment of the present invention.

Please refer to FIG. 7. FIG. 7 illustrates a headlight control system 20 in accordance with another embodiment of the present invention. The headlight control system 20 further includes a second light sensor 21 and a second driving motor 23. The second light sensor 21 is disposed on a shell surface of the automobile 50 (Please refer to FIG. 1 again). The microcontroller 12 is electrically connected to the second light sensor 31 and the second driving motor 23. The microcontroller 12 is configured to receive a signal transmitted from the second light sensor 21. Based on the signal, the microcontroller 12 can issue different control instructions to the power module 14.

For example, when a value of the a luminous flux received by the second light sensor 21 is less than a first luminous flux value (such as 150 lm), the microcontroller 12 would generate a control instruction to the power module 14. Afterward, the power module 14 is configured to power the headlight 51 in order to make the headlight 51 emit light. Furthermore, when a value of luminous flux received by the second light sensor 21 is less than a second luminous flux value (such as 50 lm; maybe vehicles travel in a mountain with no street light.), the microcontroller 12 would generate another control instruction to the power module 14. Afterward, the power module 14 is configured to supply more power into the headlight 51 in order to make the headlight 51 emit stronger light and increase the security when driving in the mountain. Conventionally the intensity of a headlight can not be controlled. However, the headlight control system 20 of the present embodiment is based on the external environment to adjust the intensity of the light.

In addition, based on the control instructions from the microcontroller 12, the second driving motor 23 is configured to drive a second driving mechanism 23A, and then the second driving mechanism 23A is configured to move the optical lens module 15. For example, when a speed value of the automobile 50 detected by the velocity sensor 53 is less than the second speed value (such as 10 km per hour), the microcontroller 12 will generate and send a control instruction to the second driving motor 23. Afterward, based on the control instruction, the second driving motor 23 would drive the second driving mechanism 23A. The second driving mechanism 23A would move the optical lens module toward the headlight 51. Specifically, when the projection focal length of the headlight 51 is changed (Please refer to FIG. 8 which illustrates a schematic diagram of the headlight 51 shortening a projection focal length), the illumination range of the headlight 51 would extend at both sides. Traditionally, when drivers need to find an address by the curb, the drivers use a manual way to switch the projection focal length of the headlight 51 for having a wider illumination range. However, when the vehicle is driven at a low speed, the headlight control system 20 would automatically turn down the projection focal length of the headlight 51. The illumination range at both sides of the street is increased, so the drivers easily see addresses on both sides of the street. From the above, the second driving motor 23 for example is a stepper motor and the second driving mechanism 23A is configured to use a multi-stage approach for adjusting an angle of the optical lens module 15 (not illustrated).

In summary, the first driving motor 13 is mainly configured to adjust the irradiation angle of the headlight 51, and the second driving motor 23 is mainly configured to adjust the projection focal length of the headlight 51. They have different driving effects on the headlight 51. However, through shifting and adjusting the first driving mechanism 13A, the first driving motor 13 also can adjust the projection focal length of the headlight 51. As a result, the second drive motor 23 doesn't need to be used. For example, when a speed value of the automobile 50 detected by the velocity sensor 53 is less than a third speed value (such as 10 km per hour), the first driving mechanism 13A is configured to shorten the projection focal length of the headlight 51.

Furthermore, headlights of automobiles are used as an example in all the above embodiments, but person having ordinary skills in the art may use the headlight control system 10 or the headlight control system 20 with a headlight of a scooter or others. In addition, the headlight control system 20 not only automatically controls the irradiation angle or the projection focal length of the headlight 51 but also provides manual control over the headlight 51. Specifically, if the driver changes the controlling way of the headlight 51 from automatic to manual, the headlight control system 20 would stop controlling the headlight 51, and the driver can adjust the irradiation angle or the projection focal length through a manual instruction.

Although the description above contains many specifics, these are merely provided to illustrate the invention and should not be construed as limitations of the invention's scope. Thus it will be apparent to those skilled in the art that various modifications and variations can be made in the system and processes of the present invention without departing from the spirit or scope of the invention.

I claim:

1. A headlight control system, comprising:
    a first light sensor;
    an optical lens module disposed in front of a headlight of a vehicle in order to receive illumination of the headlight;
    a microcontroller configured to receive a signal of indicating an increased luminous flux detected by the first light sensor;
    a first driving motor electrically connected to the microcontroller and following an instruction from the microcontroller to drive a first driving mechanism to adjust the optical lens module;
    a power module electrically connected to the microcontroller and the headlight; and
    a second light sensor electrically connected to the microcontroller;
    wherein when a value of a luminous flux received by the second light sensor is less than a first luminous flux value, the power module powers the headlight;
    wherein the first driving motor is instructed to drive the first driving mechanism to adjust an angle of the optical lens module to turn an irradiation angle of the headlight into a low beam mode when the microcontroller receives the signal.

2. The headlight control system of claim 1, wherein the microcontroller is further configured to receive a speed value detected by a velocity sensor of the vehicle, and the first driving motor is instructed to drive the first driving mechanism to adjust an angle of the optical lens module to turn an irradiation angle of the headlight into a high beam mode when the detected speed value is higher than a first speed value.

3. The headlight control system of claim 1, wherein the first driving mechanism is configured to use a multi-stage approach for adjusting the optical lens module.

4. The headlight control system of claim 1, wherein the first driving motor is a stepper motor.

* * * * *